United States Patent [19]

Rhudy et al.

[11] 3,850,244

[45] Nov. 26, 1974

[54] POLYMER FLOODING PROCESS

[75] Inventors: John S. Rhudy; William B. Gogarty; Bruce L. Knight, all of Littleton; James H. Fullinwider, Aurora, all of Colo.

[73] Assignee: Marathon Oil Company, Findlay, Ohio

[22] Filed: June 13, 1973

[21] Appl. No.: 369,641

[52] U.S. Cl. ................................. 166/273, 166/274
[51] Int. Cl. ............................................ E21b 43/22
[58] Field of Search................... 166/273, 274, 252; 252/8.55 D

[56] References Cited
UNITED STATES PATENTS 3,724,545   4/1973   Knight ................................. 166/273

*Primary Examiner*—Stephen J. Novosad
*Attorney, Agent, or Firm*—Joseph C. Herring; Richard C. Willson, Jr.; Jack L. Hummel

[57] ABSTRACT

Mobility control is improved in secondary-type oil recovery through injection of two aqueous polymer solutions. The first solution effects permeability reduction and no fraction of the polymer deviates more than 5 percent from the average molecular weight polymer injected. The second solution contains a polymer which does not substantially change rock permeability, but imparts a viscosity increase to the solution. An example of the polymer used in the first solution is a partially hydrolyzed polyacrylamide or a copolymer of acrylamide and sodium acrylate or acrylic acid and in the second solution is a biopolymer.

19 Claims, No Drawings

POLYMER FLOODING PROCESS

BACKGROUND OF THE INVENTION

1. Field of the Invention

This invention relates to injecting at least two fluids through an injection well in fluid communication with a hydrocarbon-bearing subterranean formation and displacing them toward a production well to recover hydrocarbon therethrough.

2. Description of the Prior Art

Improved recoveries of hydrocarbon in secondary recovery operations have been obtained by waterflooding with mobility reducing agents. U.S. Pat. No. 3,039,529 to McKennon teaches that about 100 to about 5,000 ppm of a high molecular weight, partially hydrolyzed polyacrylamide is useful for this purpose. U.S. Pat. No. 2,771,138 to Beeson uses naturally occurring gums and polymers, aqueous solutions containing synthetic polymers, e.g. copolymers of methylvinyl ether and maleic anhydride, condensation products of fatty acids and hydroxy amines, sodium polyacrylate, polyacrylic acid, sodium polymethacrylate, etc., sucrose and crude sugar, etc., as viscosity increasing agents in waterflooding processes. Improved mobility control has also been obtained using a mobility buffer slug behind a miscible or miscible-like displacing agent, e.g. see U.S. Pat. Nos. 3,254,714 to Gogarty et al., 3,497,006 to Jones et al., 3,506,070 and 3,506,071 to Jones.

The prior art generally teaches that optimal mobility conditions, e.g. less fingering and therefore improved oil recovery, are obtained when the leading portion of the waterflood contains a viscosity increasing agent. It is preferable that the frontal portion of the waterflood has a mobility equal to or less than that of the fluids being displaced from the reservoir. Thereafter, the mobility of the waterflood is gradually increased until it is equal to that of water.

Mobility control in a formation flooding process can be obtained by reducing the permeability to the flow of specific fluids through the formation and/or by increasing the viscosity of fluids flowing through the formation. A currently accepted practice is to incorporate into a waterflood a single agent, e.g. a partially hydrolyzed, high molecular weight polyacrylamide, to effect mobility control. The injection of a single mobility decreasing polymer, however, is inefficient. These polymers typically have broad molecular weight distributions, and, as a result, only a small fraction of the polymer may be useful to effectively reduce formation permeability. This fraction may typically be ten percent (or less) of the total polymer present. When this permeability reducing fraction has been deposited on the rock matrix, mobility control by increased viscosity is minimal because of the low effective viscosity of the remaining polymer. Or, if the molecular weight distribution is too broad and the average molecular weight too high, the permeability and injectivity may be reduced too much to permit efficient oil recovery. Thus, obtaining improved mobility control through the use of a single polymer is inefficient and can be ineffective.

SUMMARY OF THE INVENTION

Applicants have discovered a method of improving mobility control of a flooding process by injecting at least two separate aqueous polymer solutions. The first solution comprises a polymer having a substantially uniform molecular weight distribution and a high enough molecular weight to effect a substantial permeability reduction. The second solution comprises a polymer having properties which will impart increased viscosity without substantially affecting formation permeability. Essentially all of the polymer of the first aqueous polymer solution is effective in reducing formation permeability. This aqueous polymer solution will prevent denudation of the subsequent viscosity increasing polymer solutions by satisfying polymer loss occurring by sorption, e.g. adsorption, entrapment, etc. in the formation rock. The second aqueous polymer solution maintains mobility control by viscosity alone with little loss of the polymer due to mechanical entrapment. Applicants' combination is an economical and effective method of obtaining improved mobility control and improving oil recoveries in secondary type recovery processes.

DESCRIPTION OF PREFERRED EMBODIMENTS

Polymers particularly useful to effect permeability reduction are the synthesized organic homopolymers, copolymers, terpolymers, etc. and chemically modified and/or chemically substituted (inorganic and/or organic substituted groups) products thereof. The polymers can have average molecular weights within the range of 500,000 to about 30,000,000 or more, preferably about 1,000,000 to about 25,000,000 and more preferably about 5,000,000 to about 20,000,000. The molecular weight used depends upon the permeability and rock properties of the reservoir to be flooded. Especially useful polymers are the polyacrylamides having about 10–70 percent of the carboxy amide groups hydrolyzed to carboxyl groups, e.g. fractioniated Pusher polymers (Pusher is a trademark of Dow Chemical Company, Midland, Michigan, U.S.A.), the Puser polymers are defined in U.S. Pat. No. 2,827,964 to Sandiford et al and U.S. Pat. No. 3,039,529 to McKennon. Other examples of useful polymers are defined in U.S. Pat. No. 2,842,492 to Engelhardt et al; 3,282,337 and 3,399,725 to Pye; and 3,679,000 to Kaufman. Sulfonated alkyl derivatives of acrylamide are also useful. Any polymer which effectively reduce the permeability of the formation rock to the flow of aqueous solution may be used with the present invention. The polymer solution should contain a substantially uniform molecular weight polymer designed for the properties of the specific formation rock with essentially no fraction deviating more than five per cent from the average molecular weight of the polymer in the aqueous polymer solution. The average molecular weight of the polymer within the first solution must be high enough to substantially reduce the permeability of the formation rock to the flow of aqueous solutions. Also, it must be low enough so as not to completely plug the formation and thereby decrease injectivity. Thus, polymer for a specific formation should be designed so that the average molecular weight is higher for formation rock exhibiting high permeability to the flow of aqueous solutions or lower for formation rock which exhibits lower permeability to the flow of aqueous solutions. For example, if the average permeability is above about 150 md, the average molecular weight is preferably greater than about 10,000,000 but if the average permeability is about 25 to about 150 md, then the average molecular weight of the polymer preferably is about 500,000 to about 10,000,000. The polymer within the first solution may be present in concentrations of about 50 to about 5,000 ppm, more preferably about 75 to about 3,000 ppm and most preferably about 100 to about 2,000 ppm.

Polymers of the second solution useful as viscosity increasing agents include biopolymers, homopolymers, copolymers, terpolymers, etc., and chemically modified and/or chemically substituted (inorganic and/or organic groups) products thereof. Molecular weights of these polymers can be about 500,000 to about 25,000,000, preferably about 750,000 to about 10,000,000 and more preferably about 1,000,000 to about 3,500,000. Again, the desired molecular weight is dependent upon the properties of the specific formation. The properties of these polymers should not permit a substantial reduction in permeability of the reservoir rock. Preferred polymers are biopolymers including polysaccharides and their derivatives (e.g. Kelzan-MF, a polysaccharide polymer marketed by the Xanco Division of Kelco Chemical Co., San Diego, California, U.S.A.); see U.S. Pat. No. 3,305,016 to Lindblom for a description of biopolymers. Also useful are water-soluble, linear, high molecular weight monoalkyl aromatic sulfonate polymers as defined in U.S. Pat. No. 3,067,161 to Ross and other viscosity increasing agents defined in U.S. Pat. No. 2,728,725 to Gloor; 3,050,778 to Konia et al; 3,000,830 to Faun et al; U.S. Pat. No. 3,039,529 to McKennon; and U.S. Pat. No. 3,697,000 to Kaufman (N-sulfohydrocarbon substituted acrylamide polymers). The polymer of the second solution may be present in concentrations of about 50 to about 5,000 ppm, more preferably about 75 to about 3,000 ppm and most preferably about 100 to about 2,000 ppm. The second solution may be injected in quantities of about 1 to about 500 percent formation pore volume, more preferably about 5 to about 200 percent formation pore volume and most preferably about 10 to about 100 percent formation pore volume.

A flooding agent, such as a miscible agent, a miscible-like agent, a hydrocarbon or water solubilizing agent, an immiscible agent or any other agent which tends to reduce interfacial tension between oil and water within the formation, may be useful with the invention. These agents are preferably injected prior to the injection of the aqueous polymer solutions. Examples of such flooding agents include oil- and water-external emulsions, oil- and water-external micellar dispersions, hydrocarbon and/or water containing surfactants, alcohols, electrolytes, and like components or mixtures thereof. Uses of flooding agents are taught in U.S. Pat. No. 3,254,714 to Gogarty et al; U.S. Pat. No. 3,307,628 to Sena; U.S. Pat. No. 3,356,138 to Davis, Jr. et al; U.S. Pat. No. 3,376,925 to Coppel; U.S. Pat. No. 3,406,754 to Gogarty; U.S. Pat. No. 3,348,611 and U.S. Pat. No. 3,330,343 to Reisberg; U.S. Pat. No. 3,354,953 to Morse; U.S. Pat. Nos. 3,373,809 and 3,446,282 to Cook, Jr. et al; etc. The preferred flooding agent is a micellar dispersion.

EXAMPLES

The following examples are not intended to limit the invention in any way. Rather, all equivalents of specifics taught within the specification and appended claims are intended to be included within the scope of the invention.

EXAMPLE I

Sandstone cores having permeabilities of about 80 md are cleaned and then saturated with water. The cores are flooded with polymer solutions described in Table 1:

TABLE I

| | Polymer | FLOODING RESULTS Permeability (md) | Reciprocal Mobility (cp) | Flushed Permeability (md) | Permeability Reduction | Effective Viscosity |
|---|---|---|---|---|---|---|
| Case I | 5 pore volumes 500 ppm of Kelzan MF | 74 | 5.2 | 28 | 2.6 | 2.00 |
| Case II | 5 pore volumes 500 ppm of partially hydrolyzed polyacrylamide | 78 | 15.2 | 7.2 | 10.9 | 1.40 |
| Case III | 2 pore volumes 500 ppm partially hydrolyzed polyacrylamide followed by 3 pore volumes of 250 ppm Kelzan MF | 86 | 19.5 | 7.9 | 10.9 | 1.79 |

Case I. About 5 pore volumes of polymer solution containing 500 ppm bioplymer (Kelzan MF) is injected at a constant rate of 2 ft/day. A reciprocal mobility of 5.2 cp is realized through a permeability reduction of 2.6 and an effective viscosity of 2.00 cp.

Case II. Same as case I except 5 pore volumes of 500 ppm partially hydrolyzed polyacrylamide (intrinsic viscosity of about 11 dl/gm in a 2 N sodium chloride solution) is injected. A reciprocal mobility of 15.2 cp is realized through a permeability reduction of 10.9 and an effective viscosity of 1.40 cp.

Case III. Same as Case I and II except 2 pore volumes of 500 ppm partially hydrolyzed polyacrylamide are first injected followed by 3 pore volumes of 250 ppm biopolymer.

The highest reciprocal mobility (19.5 cp) is realized by the higher permeability reduction of the polyacrylamide and the higher effective viscosity of biopolymer with less total polymer injected.

EXAMPLE II

Similar to Example I except 150 md Illinois sandstone cores are used. Polymer 1 is a polyacrylamide copolymer (intrinsic viscosity = 19.8 dl/g) and polymer 2 is an N-sulfohydrocarbon substituted acrylamide homopolymer (intrinsic viscosity = 13.4 dl/g). Improvements similar to Example I are effected.

What is claimed is:

1. In a process of recovering hydrocarbon from a hydrocarbon-bearing subterranean formation having at least one injection means in fluid communication with at least one production means and wherein polymer solution is injected into the formation to displace hydrocarbon toward the production means through which hydrocarbon is recovered, the improvement comprising injecting a first solution comprised of substantially uniform molecular weight polymer of sufficient concentration and sufficient molecular weight to substantially effect permeability reduction of the formation rock, and then injecting a second solution comprised of a polymer that will not substantially effect further permeability reduction of the formation rock but of a sufficient polymer concentration to impart increased viscosity to the polymer solution for more favorable mobility control in the displacement of hydrocarbon from the formation.

2. The process of claim 1 wherein the average molecular weight of the polymer within the first solution is greater than about 10,000,000 and the average permeability of the formation rock is above about 150 md.

3. The process of claim 1 wherein the polymer within the first solution is a partially hydrolyzed, high molecular weight polyacrylamide or copolymer of acrylamide and sodium acrylate or acrylic acid.

4. The process of claim 3 wherein the polyacrylamide is present at a concentration of about 100 to about 2,000 ppm.

5. The process of claim 1 wherein the polymer within the second solution is a partially hydrolyzed, high molecular weight polyacrylamide.

6. The process of claim 5 wherein the polyacrylamide has a molecular weight of about 500,000 to about 10,000,000.

7. The process of claim 5 wherein the concentration of polyacrylamide is about 100 to about 2,000 ppm.

8. The process of claim 1 wherein the polymer within the second solution is a biopolymer.

9. The process of claim 8 wherein the biopolymer is a polysaccharide.

10. The process of claim 1 wherein the polymer within the second solution is an N-sulfohydrocarbon substituted acrylamide polymer.

11. The process of claim 1 wherein the injection of the first solution is preceded by an injection of a miscible or miscible-like flooding agent.

12. The process of claim 11 wherein the miscible flooding agent is a micellar dispersion.

13. An improved process for effecting mobility control in a process for recovering hydrocarbon from a hydrocarbon-bearing formation wherein an aqueous polymer solution is injected into the formation through an injection means and displaced toward a production means to recover hydrocarbon therethrough and wherein the formation rock has an average permeability of at least about 25 md, the improved process comprising:

1. injecting about 5 to about 75 percent formation pore volume of a first aqueous polymer solution containing a polymer having a substantially uniform molecular weight within the range of about 500,000 to about 30,000,000, uniform molecular weight being defined as having substantially no fraction of the polymer which deviates more than about 5 percent from the average molecular weight of the polymer, and being sufficient molecular weight and sufficient concentration to effect permeability reduction of the formation rock, and then 2. injecting about 10 to about 100 percent formation pore volume of a second aqueous polymer solution containing a polymer having an average molecular weight of about 500,000 to about 10,000,000, the molecular weight not being high enough to substantially effect permeability reduction of the formation rock, and the polymer in sufficient concentration to impart favorable mobility control, and 3. displacing the aqueous polymer solutions of "1)" and "2)" toward the production means to recover hydrocarbon therethrough.

14. The process of claim 13 wherein the polymer within the aqueous polymer solution of step "1)" is a partially hydrolyzed, high molecular weight polyacrylamide.

15. The process of claim 13 wherein the polymer within the aqueous polymer solution of step "2)" is a biopolymer.

16. The process of claim 15 wherein the biopolymer is a polysaccharide.

17. The process of claim 13 wherein the polymer within the aqueous polymer solution of step "2)" is an N-sulfohydrocarbon substituted acrylamide polymer.

18. The process of claim 13 wherein step "1)" is preceded by an injection of a miscible or miscible-like flooding agent.

19. The process of claim 18 wherein the miscible-like flooding agent is a micellar dispersion.

* * * * *